ered Apr. 10, 1956

2,741,532
PRODUCING COLORED CELLULOSIC TEXTILES

John D. Guthrie, New Orleans, La., assignor to the United States of America as represented by the Secretary of Agriculture No Drawing. Application April 30, 1952,
Serial No. 285,300

3 Claims. (Cl. 8—17)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to etherifying a cellulosic textile material containing hydroxyl groups with a high molecular weight color group, thus resulting in fast dying of the textile material.

The cellulosic textile materials with which the present invention is concerned are complex high molecular weight materials which are comparatively unreactive. In general, it has been possible to etherify such materials only with low molecular weight reactants as for example certain of the organic reagents containing from one to four carbon atoms.

However, in accordance with the present invention, such materials are etherified by reacting the materials in the presence of an alkali metal hydroxide with certain high molecular weight dye compounds having the formula

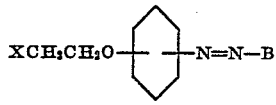

where X is an ether forming radical capable of combining with the hydrogen of the cellulosic material hydroxyl groups, preferably the radical OSO₃H or a halogen atom, so that the resulting textile material contains an etherifying group having the structure

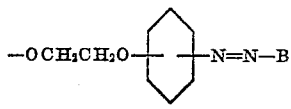

which dye compound is inert to concentrated aqueous alkali metal hydroxides, and is soluble in 20% aqueous sodium hydroxide to at least the extent of 0.8 gram of compound per 100 grams of the aqueous sodium hydroxide.

The cellulosic textile materials which can be so etherified are those which contain hydroxyl groups and which are thermally stable up to about 80° C. Suitable textile materials include cotton, linen, ramie, sisal, hemp, regenerated cellulose in the form of rayon, as well as the aminoethylated celluloses, carboxymethylated celluloses, phosphorylated celluloses, and the like derivatives of cellulose which contain hydroxyl groups. Esters and the like derivatives may in certain circumstances undergo a certain degree of substitution of ether groups or hydroxyl groups for ester groups depending upon the reactivity of the derivative toward an aqueous alkali. The cellulosic textile material can suitably be etherified in the form of fibers, sliver, yarns or fabric.

B of the dye compound is a polysubstituted aromatic hydrocarbon radical containing at least two substituents of the group consisting of SO₃H and OH radicals. Dye compounds in which B is a polysubstituted phenyl or naphthyl radical, as for example, a dihydroxy phenyl, a disulfophenyl, and radicals such as a dihydroxydisulfonaphthyl, an aminohydroxysulfonaphthyl, a hydroxydisulfonaphthyl or a hydroxysulfonaphthyl are particularly preferred. The latter mentioned substituted naphthyl radicals have been found to be especially suitable.

The above-mentioned particularly preferred compounds, are novel dyes and are soluble in aqueous alkali. In general they are produced by reacting 2-(p-aminophenoxy) ethylsulfuric acid or 2-(p-aminophenoxy) ethyl chloride with a nitrite salt in an aqueous solution containing a slight excess of a strong acid, and adding the resulting solution containing the formed diazonium salt, cooled to a temperature below about 10° C., to an aqueous solution containing a polysubstituted aromatic hydrocarbon in which the substituents are at least two radicals of the group consisting of OH and SO₃H, and also containing an excess of alkali metal carbonate, the temperature being maintained below about 5° C. The resulting products can be isolated from the reaction mixture by salting them out of solution with an inert water soluble salt such as sodium sulfate or sodium chloride and removing them by filtration, centrifugation, or the like.

The preferred method of etherifying a cellulosic textile material in accordance with the process of the invention comprises impregnating the material with an aqueous solution containing at least 10% of an alkali metal hydroxide and the compound with which the cellulosic textile material is to be etherified and curing the impregnated material. The extent of reaction can be controlled both by varying the amount of the etherifying reagent and by varying the time and temperature of curing.

The impregnation is preferably effective at room temperature although the temperature conditions are not critical, and can be varied from the freezing temperature to the decomposition temperature of the organic reactants and products. Varying the temperature has the same general type of effect produced by varying the temperature of impregnating a similar cellulosic material with a mercerizing solution.

Sodium hydroxide is a particularly preferred alkali metal hydroxide, although potassium or lithium hydroxide can be employed.

The impregnation of the cellulosic textile material can be conducted in a batchwise or continuous manner. In a particularly preferred mode of operation, a fibrous cellulosic material is allowed to remain in contact with the impregnating solution only until enough solution to wet all of the fibers has been taken up. When impregnated in accordance with the process of the copending application of W. A. Reeves, J. R. Corley and J. D. Guthrie, Serial Number 238,366, filed July 24, 1951, a fibrous cellulosic material can be etherified in accordance with the present process in the form of sliver and converted, batchwise or continuously, to wash fast dyed fibers which can be blended and converted to yarns and fabrics with other fibers. Varying the length of time for which the cellulosic material is left in contact with the impregnating solution varies the extent of reaction and of degradation of the cellulosic material in substantially the same general manner that the same effects are varied by varying the time a similar material is left in contact with a mercerizing solution.

The curing of the impregnated cellulosic textile material can be suitably accomplished by the use of the conventional apparatus for processing the particular form of material treated. For example, sliver, yarn or fabric can be cured by passing it over heated rotating cans, through ovens or curing chambers. The curing temperature can be varied over a wide range, as for example, from room temperature to the decomposition temperature of the cellulosic material. The length of time for which the material is subjected to the curing temperature will vary with the degree of reaction desired. Longer times at higher temperatures promote further reaction, but at the same time tend to promote further degradation. Particularly good results are obtained with cotton fabrics by subjecting them to from 100 to 120° C. for from 1 to 2 hours.

Concentrations of from 15 to 25% of alkali metal hydroxide are particularly suitable for the impregnating solution.

The etherification can be preceded by, or accompanied by, treatments with any of the commonly employed wetting or dispersing agents, e. g., phenolic compounds such as the cresylic acids, with or without solvents such as hexanol to increase the wetting power, sulfonated acids, sulfuric acid esters of aliphatic alcohols, and the like agents.

U. S. Patent 2,459,222 relates to a process for the production of aminoethylated cellulosic materials which have markedly improved properties of dyeing with acid dyes. A particularly advantageous feature of the present invention is that a cellulosic textile material can be aminoethylated in the same operation in which it is etherified in accordance with the process of the present invention. This is accomplished by incorporating 2-aminoethyl sulfuric acid in the impregnating solution. The most suitable concentrations of 2-aminoethylsulfuric acid to be used are discussed in detail in Patent 2,459,222. By virtue of this feature of the present invention, it is possible to produce a wash fast dyed cellulosic textile material which is capable of being further dyed by the acid dyes.

Another advantageous feature of the present invention is that the ether linkages by which the color-producing groups are attached to the cellulose of the wash fast dyed cellulosic textile materials are stable to reagents which cleave azo groups. For example, a yellowish orange fabric in which B of the dye compound is a dihydroxyphenyl radical can be decolorized by reacting it with an aqueous solution of hydrosulfite ion. The decolorized fabric can then be diazotized and coupled with 2-naphthol-3,6-disulfonic acid by contacting it with a cold aqueous solution containing the acid and an excess of sodium carbonate. The so treated fabric is wash fast dyed an orange shade of red. By varying, in the conventional manner, the extent of the indicated cleavage and coupling reactions, a wide variety of shadings and colors can be attained.

Dye compounds of the formula

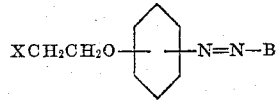

in which B is a monosubstituted phenyl or naphthyl radical are less soluble in concentrated aqueous alkali than those in which the phenyl or naphthyl radical is polysubstituted. Such dye compounds of lesser aqueous alkali solubility but having a solubility in aqueous sodium hydroxide of at least 0.8 gram per 100 grams of a 20% sodium hydroxide solution can, however, be employed under proper circumstances. The particularly preferred process for producing comparatively deeply dyed cellulosic textile materials with such dye compounds comprises impregnating the cellulosic material with an aqueous solution of the dye, drying the impregnated material, impregnating the dried material with an aqueous solution of sodium hydroxide of mercerizing strength, and then curing the impregnated material. The cellulosic textile material can be aminoalkylated as well as dyed by employing an aqueous alkali solution of mercerizing strength containing also 2-aminoethylsulfuric acid.

The following examples exhibit the invention in detail relative to the preparation of the dye compounds:

EXAMPLE I

Diazotization

One gram of 2-(p-aminophenoxy)ethylsulfuric acid was dissolved in 13 ml. of water and 1 ml. of concentrated hydrochloric acid and diazotized at about 13° C. by the addition of 0.3 gram of sodium nitrite.

Coupling

The solution containing the formed diazonium salt was cooled to about 5° C. and slowly added to an ice cold solution of 0.45 gram of resorcinol and 1.5 grams of sodium carbonate in 13 mls. of water. The resulting mixture was warmed to 45° C. The dye was salted out of solution by the addition of 1 gram of sodium sulfate and was separated by filtration and dried in a vacuum.

EXAMPLE II

Diazotization 0.25 gram of 2-(p-aminophenoxy) ethyl chloride was dissolved in 10 ml. of water and 0.25 ml. of concentrated hydrochloric acid and diazotized at about 15° C. by the addition of 0.11 gram of sodium nitrite.

Coupling

The solution containing the formed diazonium salt was cooled to about 5° C. and slowly added to an ice cold solution of 0.14 gram of resorcinol and 0.4 gram of sodium carbonate in 10 mls. of water. The resulting mixture was warmed to 25° C. The dye was separated by filtration and dried in a vacuum. It was orange-red colored.

A number of other dyes were produced by similar processes. The X and B groups, acid or halogen salt used, and color of the formed dye, are indicated in the following Table 1 for Examples I and II and also for the other examples.

TABLE 1

| Example | Compounds Diazotized, $XCH_2CH_2O-\langle\rangle-NH_2$, where X is— | Compound Coupled to form B group of $XCH_2CH_2O-\langle\rangle-N=N-B$ | Color |
|---|---|---|---|
| I | $HO_3SO-$ |  | Orange. |
| II | $Cl-$ |  | Orange-red. |
| III | $HO_3SO-$ | 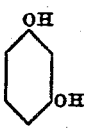 | Purplish-red. |
| IV | $HO_3SO-$ |  | Reddish-blue. |
| V | $HO_3SO-$ | 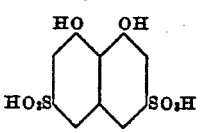 | Dark red. |
| VI | $HO_3SO-$ | 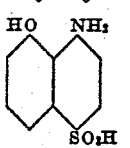 | Light red. |
| VII | $Cl-$ | 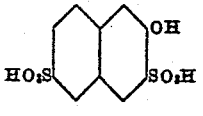 | Purplish red. |
| VIII | $Cl-$ | 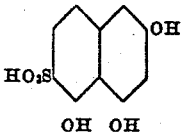 | Dark red. |

The following examples exhibit the invention in detail relative to the process of etherifying the cellulosic textile materials.

EXAMPLE IX

A sleeve of a 78 square print cotton cloth was fitted over a stainless steel beaker and was impregnated with a solution of 250 mg. of the dye prepared by the process of Example I dissolved in 25 ml. of 20% sodium hydroxide by swabbing the solution onto the cloth. The impregnated material was cured by subjecting it to 110° C. for 1 hour in a forced draft oven. The cured material was washed with hot water. Its fabric qualities, i. e., tensile strength, hand, and feel, were substantially unchanged.

Samples of the same cloth used in Example IX were dyed in a similar manner except for the dyes used. The fabric qualities of the dyed cloths were substantially unchanged. The dyes used and colors resulting for Example IX and for the other examples are listed in the following Table 2.

TABLE 2

| Example | Dye Used | Color of Dyed Cloth |
|---|---|---|
| IX | Of Example I | Yellowish-orange. |
| X | Of Example III | Purplish-red. |
| XI | Of Example IV | Reddish-blue. |
| XII | Of Example V | Red. |
| XIII | Of Example VI | Peach-pink. |

In the following examples the impregnated fabric was cured at 100° C. for 40 minutes. The fabrics dyed in this manner had the same color, but a slightly lighter shade than those dyed in the above manner with dyes having the same formula except for the ether forming group (X).

| XIV | Of Example II | Yellowish-orange. |
| XV | Of Example VII | Purplish-red. |

The following examples exhibit a process of cleaving the azo group of a colored cellulose ether provided by this invention, rediazotizing the so decolorized ether and recoupling it to produce an ether of a different color.

EXAMPLE XVI

A sample of the yellowish-orange cloth dyed by the process of Example IX was placed in a solution of 5 grams of sodium hydrosulfite in 1500 mls. of water and heated for 75 minutes at about 90° C. The cloth was decolorized. It was then washed with water and diazotized at about 13° C. by placing it in a solution of 1 gram of sodium nitrite, 200 mls. of water and 5 mls. of concentrated hydrochloric acid and allowing it to remain for 10 minutes. It was then transferred to an ice-cold solution of 1 gram of 2-hydroxynaphthalene-3,6-disulfonic acid, 200 mls. of water and 5 grams of sodium carbonate. In 30 minutes the coupling had proceeded until the cloth was colored an orange shade of red. Its fabric qualities were substantially unchanged.

EXAMPLE XVII

A sample of the same cloth decolorized, diazotized and coupled in the same manner with beta-naphthol had a brilliant orange color and substantially unchanged fabric qualities.

EXAMPLE XVIII

A sample of the same cloth decolorized, diazotized and coupled in the same manner with p-cresol had a yellow color and substantially unchanged fabric qualities.

EXAMPLE XIX

A sample of the same cloth decolorized, diazotized and coupled in the same manner with 1,8-dihydroxy-naphthalene-3,6-disulfonic acid had a red color and substantially unchanged fabric qualities.

EXAMPLE XX

A sample of the cloth which was etherified with a dye prepared by coupling 2-(p-aminophenoxyl)ethylsulfuric acid with p-cresol was decolorized and coupled with representatives of the Naphthol AS series. In each case the color of the cloth was converted from yellow to a pink and the fabric qualities of the cloth were substantially unchanged.

That the series of experiments described in Examples XVI to XX established unique properties of cellulosic materials etherified by azo dyes, was demonstrated by dyeing similar samples of cloth with dyes prepared by coupling naphthol AS to Bordeaux salt, Red salt, and Scarlet salt and subjecting the dyed cloths to decolorizing, diazotizing treatments in the above manner. In no case could the decolorized cloths be coupled with 2-hydroxynaphthalene-3,6-disulfonic acid to produce any color.

The following example exhibits in detail relative to the process of etherifying the cellulosic textile materials in the same operation in which the material is aminoethylated.

EXAMPLE XXI

A sample of the same cloth was impregnated by the process of Example IX with a solution of 100 mg. of the dye of Example I in 10 mls. of a solution of 65 parts water, 25 parts sodium hydroxide and 10 parts 2-aminoethylsulfuric acid. The impregnated material was cured by subjecting it to 100° C. for 1 hour. The fabric was orange in color and its fabric qualities were substantially unchanged. The fabric exhibited the ease of dyeing with acid dyes and characteristic of aminoalkylated collulosic materials. The cloth which had only been etherified with a dye was substantially unaffected by the Kiton Fast Red.

The dyed fabrics produced by etherifying cellulosic materials with dyes in accordance with the process of the invention were subjected to conventional tests for wash fastness and light fastness. They were found to have outstanding (class 5) wash fastness. They showed little loss of color when boiled in 1% sodium hydroxide solution for 6 hours and did not fade or bleed in the AATCC36-45 No. 4 wash test at 182° F. with chlorine bleach.

In Fademeter tests, in direct comparison with cotton fabrics dyed with commercial developed azo dyes they showed equal or better light fastness.

I claim:

1. A process of etherifying a cellulosic textile material containing hydroxy groups with a dye compound, comprising, forming an aqueous solution containing from about 15 to 25% of an alkali metal hydroxide and at least about 0.8% of a dye compound having a solubility of at least about 0.8 gram per 100 grams of an aqueous sodium hydroxide solution containing 20% sodium hydroxide, said dye compound having the formula

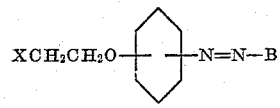

in which X is selected from radicals consisting of $OSO_3H$ and Cl and B represents a radical of the group consisting of phenyl and naphthyl having at least two substituents of the group consisting of OH and $SO_3H$, and impregnating the material with the solution.

2. A process of etherifying a cellulosic textile material containing hydroxyl groups concurrently with a dye compound and 2-aminoethyl sulfuric acid, comprising, forming an aqueous solution containing from 15 to 25% of an alkali metal hydroxide, about 10% of 2-aminoethyl sulfuric acid, and at least about 0.8% of a dye compound having a solubility of at least about 0.8 gram per 100 grams of an aqueous sodium hydroxide solution containing 20% sodium hydroxide, said dye compound having the formula

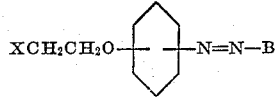

in which X is a member selected from the radicals consisting of $OSO_3H$ and Cl and B represents a radical of the group consisting of phenyl and naphthyl having at least two substituents of the group consisting of OH and $SO_3H$, and impregnating the material with the solution.

3. A process of etherifying a cellulosic textile material containing hydroxyl groups with a dye compound, comprising, forming an aqueous solution containing from about 15 to 25% of an alkali metal hydroxide and at least about 0.8% of a dye compound having a solubility of at least about 0.8 gram per 100 grams of an aqueous sodium hydroxide solution containing 20% sodium hydroxide, said dye compound having the formula

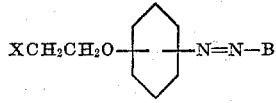

in which X is selected from radicals consisting of $OSO_3H$ and Cl and B represents a radical of the group consisting of phenyl and naphthyl having at least two substituents of the group consisting of OH and $SO_3H$, impregnating the material with the solution, and heating the impregnated material to cure it.

References Cited in the file of this patent

UNITED STATES PATENTS

| | | |
|---|---|---|
| 1,567,731 | Gunther | Dec. 29, 1925 |
| 1,886,480 | Haller | Nov. 8, 1932 |

(Other references on following page)

UNITED STATES PATENTS

| | | |
|---|---|---|
| 1,973,478 | Granacher et al. | Sept. 11, 1934 |
| 2,136,377 | Dinklage | Nov. 15, 1938 |
| 2,233,475 | Dreyfus | Mar. 4, 1941 |
| 2,243,213 | Kranzlein et al. | May 27, 1941 |
| 2,350,188 | Pinkney | May 30, 1944 |
| 2,370,537 | Heywood | Feb. 27, 1945 |
| 2,459,222 | Guthrie | Jan. 18, 1949 |

OTHER REFERENCES

Knight: J. Soc. Dyers & Colorists, vol. 66, 1950, pages 169, 172 and 173.